United States Patent [19]

Ueno et al.

[11] Patent Number: 5,510,860
[45] Date of Patent: Apr. 23, 1996

[54] PROGRESSIVE MULTIFOCAL LENS

[75] Inventors: Yasunori Ueno, Kawasaki; Toshiaki Umeda, Tokyo; Fumio Takahashi, Ibaraki, all of Japan

[73] Assignee: Nikon Corporation, Tokyo, Japan

[21] Appl. No.: 249,969

[22] Filed: May 27, 1994

[30] Foreign Application Priority Data

May 31, 1993 [JP] Japan ..................... 5-149729

[51] Int. Cl.$^6$ ........................................... G02B 7/06
[52] U.S. Cl. ............................................... 351/169
[58] Field of Search .................... 351/168, 169, 351/170, 171, 172

[56] References Cited

U.S. PATENT DOCUMENTS 5,000,559  3/1991  Takahashi et al. ............... 351/169
5,270,745  12/1993 Padrono ............................ 351/169

FOREIGN PATENT DOCUMENTS 0408067   1/1991  European Pat. Off. .
59-42285  10/1984 Japan .
63-42764  8/1988  Japan .
2-39768   9/1990  Japan .

Primary Examiner—Scott J. Sugarman
Attorney, Agent, or Firm—Shapiro and Shapiro

[57] ABSTRACT

A progressive multifocal lens of the present invention has, along a principal meridional curve, a farsight portion having a refracting power corresponding to a distant view, a nearsight portion having a refracting power corresponding to a near view, and an intermediate portion, located between the farsight and nearsight portions, for continuously connecting the refracting powers of the farsight and nearsight portions, wherein a refracting surface has a shape such that the angle $\theta$ formed by normal lines of the refracting surface at respective points on each of vertical crossing curves of the lens refracting surface and a principal meridional curve is changed gently and monotonously away from the principal meridional curve along the respective vertical crossing curves in a direction perpendicular to the principal meridional curve.

2 Claims, 4 Drawing Sheets

PROGRESSIVE MULTIFOCAL LENS

BACKGROUND OF THE INVENTION

1. Field of the Invention

The present invention relates to a progressive multifocal lens used to assist an accommodation power of an eye.

2. Related Background Art

As spectacle lenses for assisting an accommodation power when an accommodation power of an eye becomes too weak to see a near point, various progressive multifocal lenses have been known. A progressive multifocal lens of this type has an upper "farsight portion", a lower "nearsight portion" and a progressive region (referred to as an "intermediate portion") which is located between the above two portions in which a refracting power is continuously changed. When the progressive multifocal lens is actually worn as spectacles by a user, the farsight portion becomes an upper portion while the nearsight portion becomes a lower portion. In the present invention, it is to be noted that "upper portion", "lower portion", "horizontal" and "vertical" are used to point positions of the progressive multifocal lens in the state that it is actually worn by the user. For example, the lower portion of the farsight portion is a position within the farsight portion close to the intermediate portion. Also, the difference between the nearsight refracting power and the farsight refracting power is called an additional power.

In a progressive multifocal lens of this type, in general, when wide distinct vision areas of the farsight and nearsight portions are kept and coupled by the progressive power range, lens aberrations are concentrated on side regions of the progressive power range. As a result, blurring and distortion of an image occur in these side region. Therefore, when a user wears spectacles formed of these multifocal lenses and shifts his eyes laterally, he perceives the distortion of an image as the fluctuation of the image has an unpleasant feeling.

In order to prevent such a problem of visual characteristics, in known progressive power lenses, various designs and evaluations have been made from a variety of viewpoints.

FIG. 1 is a schematic plan view showing the divisions of regions of a progressive multifocal lens designed symmetrically. This progressive multifocal lens has a farsight portion F corresponding to the upper portion at the time of actual use, a nearsight portion N corresponding to the lower portion and an intermediate portion P in which the refracting power is changed continuously between the farsight and nearsight portions F and N. As for the shape of a lens surface, the intersecting curve MM' of the object-side lens surface and a cross section along a meridian line passing approximately the center of a lens surface vertically from top to bottom is used as a reference line for expressing specifications such as the additional power of the lens, and is also used as an important reference line in the lens design. In the thus designed progressive multifocal lens, the center OF of the farsight portion F, a farsight eye point E and the center ON of the nearsight portion N are located on the center line MM' as the reference.

Further, as shown in FIG. 2, in consideration of the fact that the nearsight portion N comes close to a nasal side when worn by the user, another progressive multifocal lens has been proposed in which a nearsight portion N is arranged asymmetrically (hereinafter referred to as a "asymmetrical progressive multifocal lens").

Also, in such an asymmetrical progressive multifocal lens, a center line MM' consisting of the intersecting line of an object-side lens surface and a cross section passing the center OF of a farsight portion F, a farsight eye point E and the center ON of a nearsight portion N is used as a reference line. In the present invention, these reference lines will be referred to as "a principal meridional curve" hereinafter.

Conventional progressive multifocal lenses are disclosed in, e.g., U.S. Pat. Nos. 3,687,528, 3,910,691 and Japanese Patent Publication Nos. 59-42285 and 63-42764.

In the lens disclosed in U.S. Pat. No. 3,687,528, as for the shapes of intersecting lines of planes perpendicular to the principal meridional curve and a refracting surface of the lens, only an intersecting line at a point corresponding to substantially the center of an intermediate portion defines a circular arc. Intersecting lines above and below that point define non-circular arcs in which a radius of curvature is decreased as the intersecting line is spaced apart from the principal meridional curve in a portion above the point, and vice versa in a portion below the point. Therefore, only the center of the intermediate portion defines a circular arc, and other portions define simple non-circular arcs. Therefore, distinct vision areas (a range with an astigmatic difference of 0.5 D (diopter) or less) of the farsight and nearsight portions become narrow, and a field of view is also narrowed due to an abrupt change in aberrations, resulting in considerable distortion and fluctuation of an image.

In the lens disclosed in U.S. Pat. No. 3,910,691, the dynamic vision is improved in addition to the static vision in the lens disclosed in U.S. Pat. No. 3,687,528. However, although the dynamic vision can be improved to some extent, it is still difficult to attain a sufficient performance in practical use.

In a lens disclosed in Japanese Patent Publication No. 59-42285, as for the shapes of intersecting lines each defined by a plane perpendicular to the principal meridional curve and a refracting surface of a lens, the intersecting lines define a non-circular arc in the upper portion of the farsight portion. More specifically, in the upper portion of the farsight portion, the radius of curvature of each intersecting line is decreased as it goes away from the principal meridional curve, a rate of decrease in radius of curvature approaches 0 toward an upper peripheral portion and the intersecting lines near the upper peripheral portion have a constant radius of curvature. In the lower portion of the farsight portion, the intersecting lines define non-circular arcs and the radius of curvature of each intersecting line is decreased monotonously. In the intermediate portion, the intersecting lines define non-circular arcs except for a connecting portion with the farsight portion, in which the radius of curvature of each intersecting line is increased and then decreased as it goes away from the principal meridional curve. In the nearsight portion, the radius of curvature is increased and then decreased as it goes away from the principal meridional curve.

In this lens, visual characteristics can be improved to some extent as compared to those disclosed in U.S. Pat. No. 3,910,691. However, in a peripheral region of the farsight portion, in particular, in side regions between the central and lower portions of the farsight portion, a residual astigmatic difference is still considerable. In addition, side regions of the intermediate and farsight portions still suffer from large distortion and fluctuation of an image. Thus, it is yet difficult to obtain a wide field of view.

In the lens disclosed in Japanese Patent Publication No. 63-42764, in order to improve the dynamic vision as well as the static vision, the refracting surface of the lens is divided into three portions of farsight, intermediate and nearsight portions and the manner of distortion of vertical lines is made to conform to the rule of the change of curvature between the centers of the farsight and nearsight portions on the principal meridional curve to lessen distortion of an image in side regions of the intermediate portion. Further, in order to make the distribution of astigmatic differences gentle, horizontal crossing curves consisting of the intersection lines of planes perpendicular to the principal meridional curve and a refracting surface of the lens are defined. In the farsight portion, the curvatures of the horizontal crossing curves are increased in the side regions thereof. In the nearsight portion, the curvatures of the horizontal crossing curves are decreased in the side regions thereof. In the upper portion of the intermediate portion (close to the farsight region), the curvatures of the horizontal crossing curves are once increased, then decreased and again increased while in the lower portion of the intermediate portion (close to the nearsight region), the curvatures of the horizontal crossing curves are decreased and then increased.

In this lens, the dynamic and static visions are improved to some extent as compared to that disclosed in Japanese Patent Publication No. 59-42285. However, from the side regions of the intermediate portion to the side regions of the nearsight portion, in particular, from the side regions of the lower portion of the intermediate portion to the side regions of the nearsight portion, distortion of image is still left. Moreover, the distortion and fluctuation are caused due to distortion increasing abruptly as going away from the principal meridional curve.

As mentioned above, the conventional lenses can secure a visual performance to some extent but it is not sufficient for practical use.

SUMMARY OF THE INVENTION

It is therefore an object of the present invention to provide a progressive multifocal lens which has preferable dynamic and static vision by optimizing an aberration balance by minimizing astigmatism and distortion of an image over an entire refracting surface.

In order to achieve the above object, according to the present invention, in a progressive multifocal lens having, along a principal meridional curve, a farsight portion having a refracting power corresponding to a distant view, a nearsight portion having a refracting power corresponding to a near view, and an intermediate portion, located between the farsight and nearsight portions, for continuously connecting the refracting powers of the farsight and nearsight portions, its lens refracting surface has a shape such that the angle θ formed by normal lines of the refracting surface at respective points on each of vertical crossing curves of the lens refracting surface and a principal meridional curve is changed gently and monotonously away from the principal meridional curve along the respective vertical crossing curves in a direction perpendicular to the principal meridional curve.

In a preferred embodiment of the present invention, when the refractive index of the lens is n, the distances of the above points in the horizontal direction from the principal meridional curve are H (m), the refracting power of the farsight portion is $D_F$ (diopter), and the additional power is A (diopter), any angle θ over the entire lens refracting surface satisfies the following condition:

$\tan^{-1}(H \cdot D_F/(n-1)) \leq |\theta|$ $\tan^{-1}(H \cdot (D_F+A)/(n-1)) \geq |\theta|$ As shown in FIGS. 1 and 2, in the progressive multifocal lens of the present invention having, along the principal meridional curve MM', the farsight portion F having the refracting power corresponding to a distance view, the nearsight portion N having the refracting power corresponding to a near view and the intermediate portion P, located between the farsight and nearsight portions for continuously connecting the refracting powers of the farsight and nearsight portions, the optimum shape of the lens is found and also the aberration balance is optimized over the entire refracting surface in order to obtain a sufficiently wide field of view in the farsight portion, to obtain sufficiently wide distant vision areas in the intermediate and nearsight portions for practical use, and to considerably reduce distortion and fluctuation of an image in the side regions thereof so as not to feed unpleasant in the side regions in practical use.

As mentioned above, in the progressive multifocal lens, when distinct vision areas of the farsight and nearsight portions F and N are kept wide and coupled by the intermediate portion P consisting of the progressive region, lens aberrations are concentrated on the side regions of the intermediate portion P. Therefore, the presence of these regions leads to blurring and distortion of an image, and the user who wears spectacles experiences a fluctuation of an image when he shifts his eyes laterally which gives a bad impression to the user.

In the side regions of the progressive region, lens aberrations, in particular, astigmatism occurs and also distortion of an image occurs since the magnification of the image is different in various portions of the refracting surface. Such distortion is perceived by the user not only as distortion of an image but also as fluctuation of an image when he moves his neck and an object is moved relatively to his eyes, causing unpleasant feeling. Thus, seeing a moving object is called the dynamic vision. In the meantime, there is almost no relative movement between eyes and an object such as reading a book, which case is called the static vision.

The static vision is affected chiefly by astigmatism. Namely, the smaller the astigmatism becomes and the wider the distinct vision areas of the farsight, nearsight and intermediate portions become, the more clear and pleasant vision can be obtained. On the other hand, the dynamic vision is affected chiefly by distortion of an image. Namely, the smaller the distortion of an image becomes, the lesser the fluctuation of the image becomes and the more clear and pleasant vision can be obtained.

It has been said that the static vision and the dynamic vision are not independent of each other but have a mutually contradictory relationship and when a distinct vision area is enlarged to obtain the preferable static vision, the change of magnification of an image becomes abrupt in side regions of the lens to cause the increase of distortion of the image, resulting in the defect of the dynamic vision. On the other hand, it has been said that when the dynamic vision is improved, astigmatism in side regions of the farsight and nearsight portions is increased, resulting in the defect of the static vision.

FIG. 3 is a perspective view for explaining a vertical crossing curve with respect to the refracting surface σ of the lens designed symmetrically. A geometric center of the lens is expressed as $O_G$ and an axis passing the center of curvature (not shown) of the refracting surface σ at the geometric center $O_G$ and the geometric center $O_G$ is made to be an X-axis. Y- and Z-axes are plotted respectively in the vertical and horizontal directions to have the geometric center $O_G$ as the origin.

The "vertical crossing curve" of the present invention represents the curve of the refracting surface σ cut vertically by a plane xj parallel to a principal meridional plane x0 (x–y plane) including the principal meridional curve MM'. Namely, the "vertical crossing curve" of the present invention is the intersecting curve of the plane xj and the refracting surface σ and is expressed as the vertical crossing curve Mj.

FIG. 4 shows changes of angles formed by normal lines of the lens refracting surface at respective points on a vertical crossing curve M1 and the principal meridional plane. P1, P2 and P3 are the points on the vertical crossing curve M1 within the respective farsight, nearsight and intermediate portions. The angles formed by the normal lines N1, N2 and N3 of the lens refracting surface at the respective points P1, P2 and P3 and the principal meridional plane S are expressed as K1, K2 and K3 respectively. The change of the angle θ (e.g., K1, K2 and K3) at points of each vertical crossing curve (e.g., M1) along each vertical crossing curve in the horizontal direction (the direction perpendicular to the principal meridional curve) is approximately proportional to the change of the prism amount in the horizontal direction along each vertical crossing curve. Accordingly, the changes of the angle θ along the vertical crossing curves in the horizontal direction can be regarded approximately as distortions of the vertical lines in those cross sections.

In order to reduce the distortion and fluctuation of an image, it is necessary not only to decrease the absolute value of the change amount of the prism amount in the horizontal direction but also to make the change amount of the horizontal prism along the respective vertical crossing curves gentle and monotonous toward the peripheral region of the lens, i.e., away from the principal meridional curve. That is, for the improvement of the static vision, the absolute value of the change amount of the horizontal prism needs to be decreased to reduce the distortion of an image. Also, for the improvement of the dynamic vision, the horizontal prism needs to be gently and monotonously increased or decreased toward the peripheral region of the lens.

Practically, even though the absolute value of the change amount of the horizontal prism is decreased, when the horizontal prism is changed abruptly in portions of the peripheral region, fluctuation of an image is perceived largely in those portions. Namely, the change rate of the horizontal prism is an important factor.

Thus, it is necessary to structure the shape of the lens surface such that the absolute value of the change amount of the horizontal prism is reduced for the improvement of the static vision and the change rate (the differentiated value) of the horizontal prism is gently and monotonously increased or decreased toward the peripheral region of the lens for the improvement of the dynamic vision. Therefore, the present invention is aiming at the angle θ proportional to the prism amount and establishes an essential condition that the change of the angle θ along the vertical crossing curves in the horizontal direction is gentle and monotonous away from the principal meridional curve.

Generally, in spectacle lenses, there is a close relationship between a radius of curvature and a refracting power. If the radius of curvature is R (m), the refracting power is D (diopter), and the refractive index of the lens is n, the following equation (1) holds:

$$D = (n-1)/R \quad (1)$$

When the lens refracting surface is approximated to a complete spherical surface with a radius R and a point on a vertical crossing curve being away from the principal meridional curve in the horizontal direction by a distance H (m) is considered, the following expressions (2) and (3) hold:

$$\tan \theta = H/R \quad (2)$$

$$\theta = \tan^{-1}(H/R) \quad (3)$$

Namely, from the expressions (1) and (3), the following expression (4) holds:

$$\theta = \tan^{-1}(H \cdot D/(n-1)) \quad (4)$$

In the present invention, it is necessary to satisfy the above condition that the change of the angle θ along the respective vertical crossing curves in the horizontal direction is made gently and monotonously away from the principal meridional curve and also it is preferable to satisfy the following conditions (5) and (6) at any point on the lens surface.

$$\tan^{-1}(H \cdot D_F/(n-1)) \leq |\theta| \quad (5)$$

$$\tan^{-1}(H \cdot (D_F + A)/(n-1)) \geq |\theta 5| \quad (6)$$

wherein $D_F$: the refracting power (diopter) of the farsight portion
A: the additional power (diopter)
n: the refractive index of the lens
H: the distance (m) from the principal meridional curve in the horizontal direction.

The lower limit of the condition (5) is the value of the angle θ at a point on the spherical surface having the curvature corresponding to the refracting power of the farsight portion F. The upper limit of the condition (6) is the value of the angle θ at a point on the spherical surface having the curvature corresponding to the refracting power of the nearsight portion N. Within a range defined by the angle as the minimum value corresponding to the refracting power $D_F$ (smallest refracting power) of the farsight portion F and the angle as the maximum value corresponding to the refracting power $(D_F + A)$ (largest refracting power) of the nearsight portion N, it is preferable to satisfy the above condition that the angle θ is gently or monotonously increased by decreased away from the principal meridional curve.

In designing the lens surface of such a progressive multifocal lens, the design and evaluation are not limited to the range of the circular shape of the lens. Assuming a square including the circular shape of the lens surface, the design and evaluation were performed for the surface shape within the square. Thus, by optimizing the curve of the larger surface including the circular shape of the lens, it is possible to form a practical lens surface more smoothly and excellently.

In general, as progressive multifocal lenses are worked to a spectacle frame, the respective areas of the farsight, intermediate and nearsight portions F, P and N, in particular, the areas of the farsight and nearsight portions F and N including the peripheral portion are changed largely due to the shape of the frame. Prior to work, progressive multifocal lenses are circular lenses having a diameter of 60 mm or more and supplied to spectacles shops as they are. In the spectacles shops, the lenses are worked in correspondence with desired spectacles frames.

Therefore, the prescription of the lens surface shape of the progressive multifocal lens of the present invention is determined based on the lens shape prior to work. And, for designing the optimum surface shape of the multifocal lens, it is necessary to achieve optimum aberration balance by taking into consideration not only the surface shape of the central region to be used with high frequency but also that of the larger region including the effective regions to be used.

DESCRIPTION OF THE PREFERRED EMBODIMENTS

An embodiment of the present invention will be described below with reference to the accompanying drawings.

Figure 1:
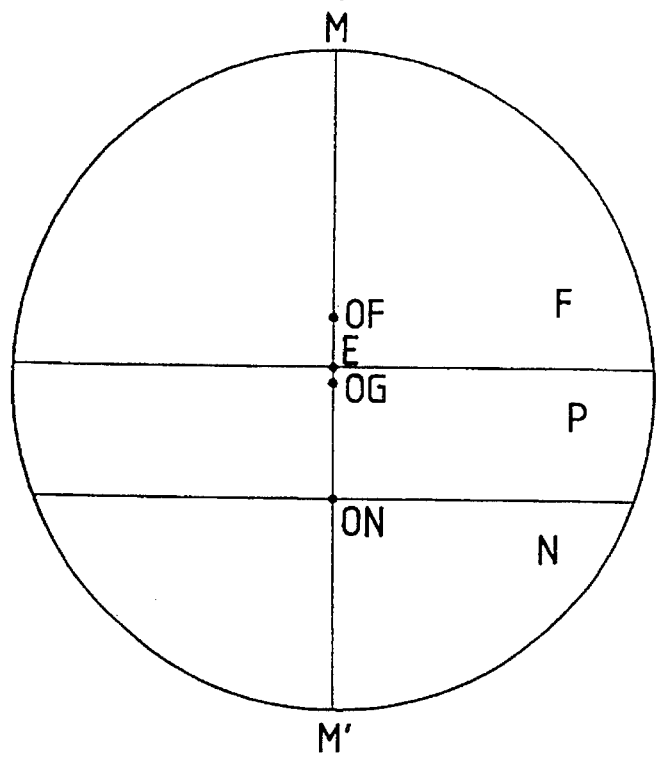
FIG. 1 is a schematic plan view showing divisions of regions of a progressive multifocal lens designed symmetrically.
Figure 2:
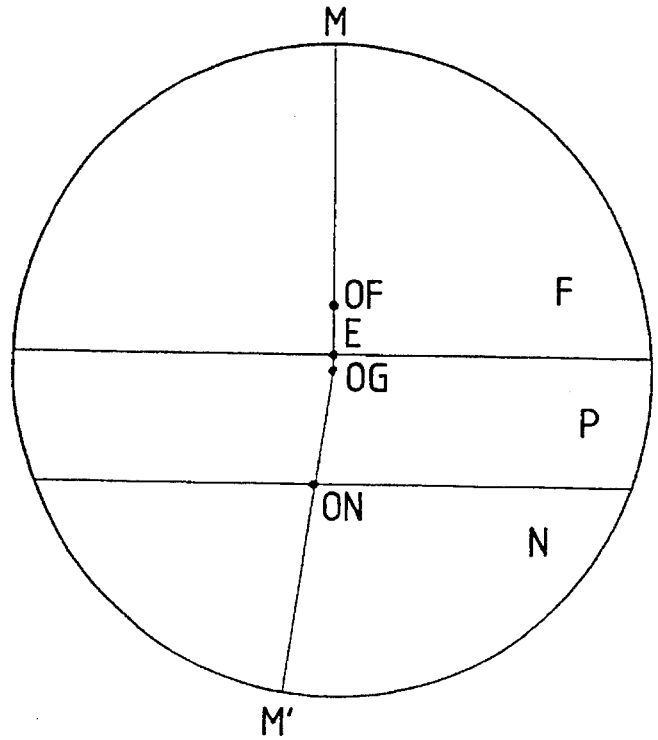
FIG. 2 is a schematic plan view showing divisions of regions of a progressive multifocal lens designed asymmetrically.
Figure 3:
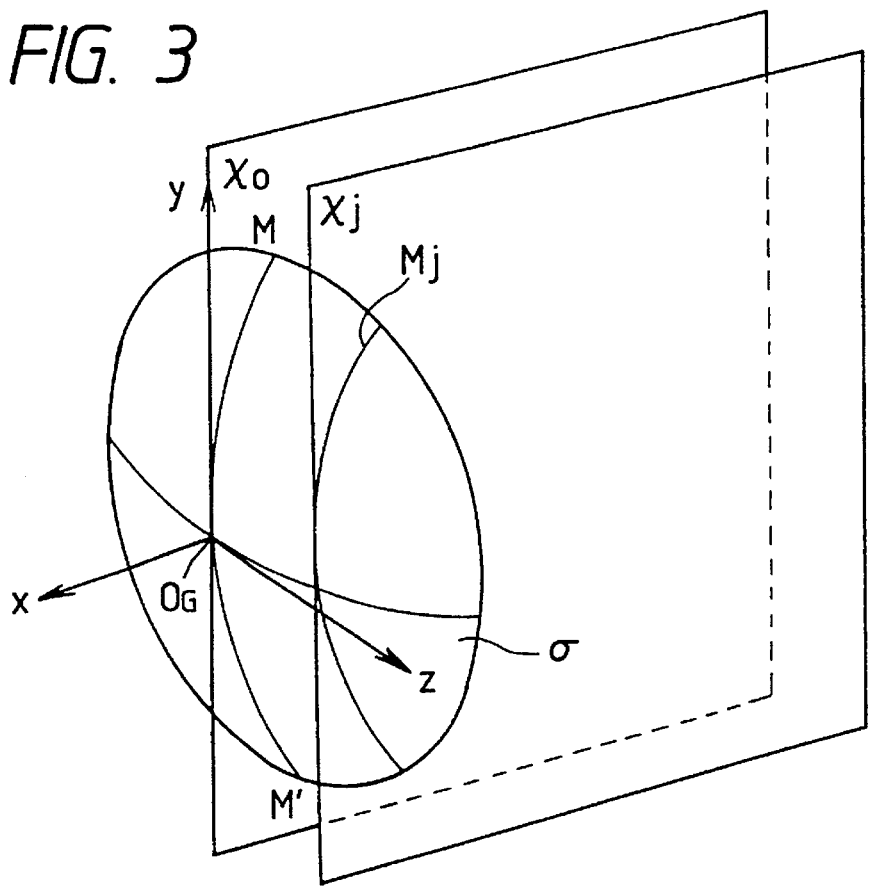
FIG. 3 is a perspective view for explaining a vertical crossing curve of a refracting surface of the progressive multifocal lens designed symmetrically.
Figure 4:
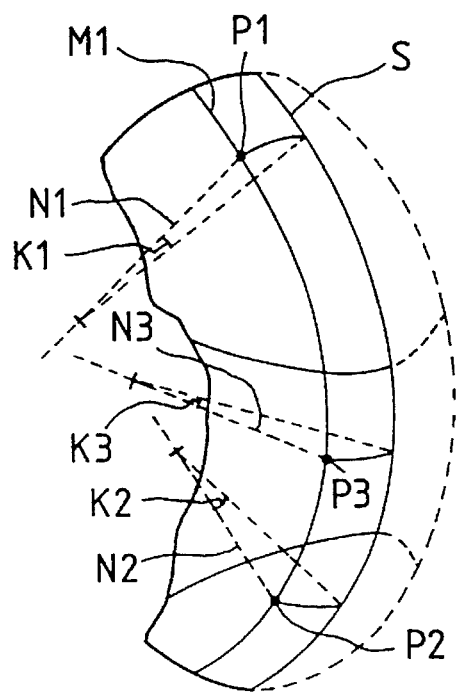
FIG. 4 is a partial view showing the change of an angle formed by normal lines of the lens refracting surface at each point on a vertical crossing curve and a principal meridional plane.
Figure 5:
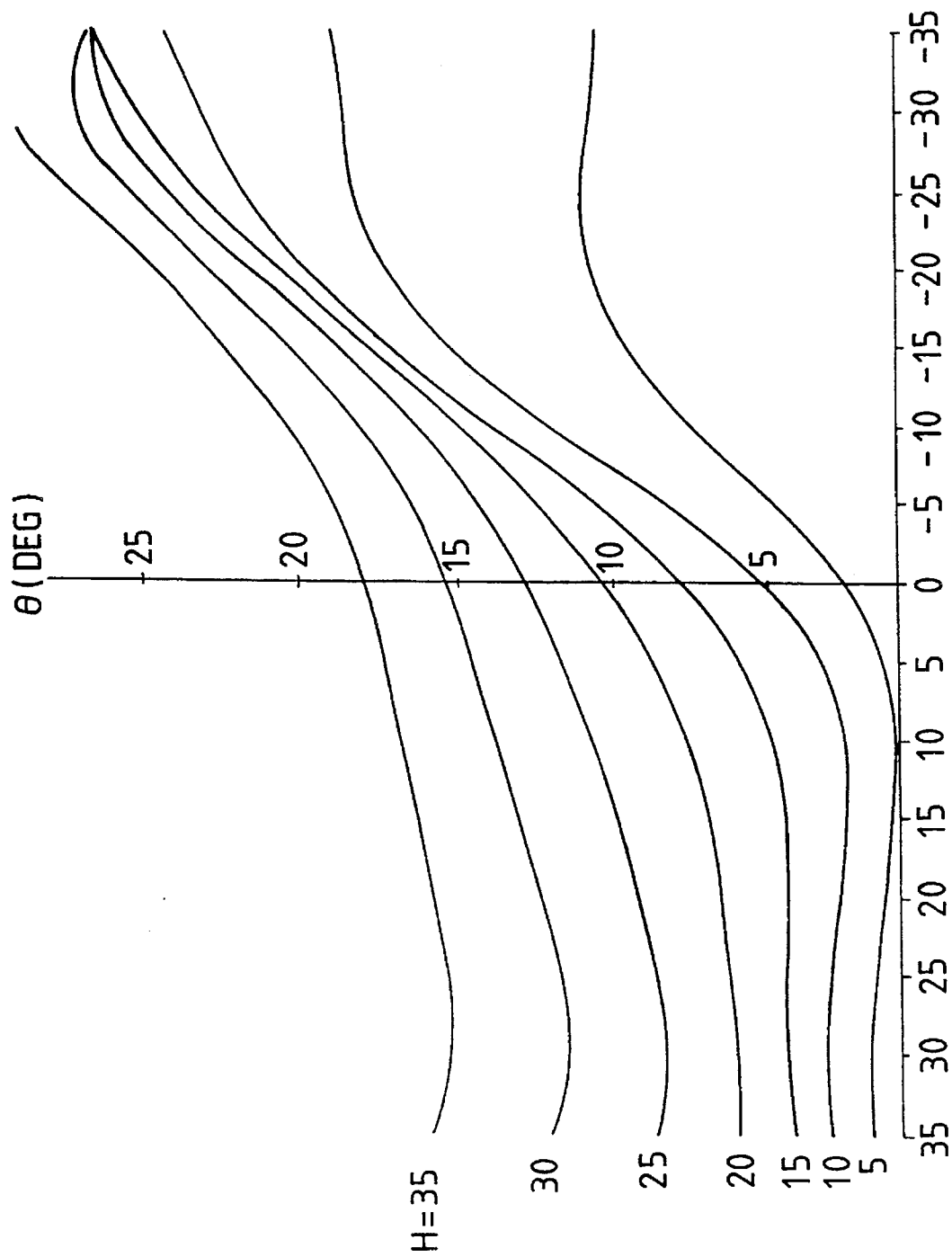
FIG. 5 is a graph showing changes of angles formed by normal lines of points along each vertical crossing curve being at respective distances from a principal meridional line of a progressive multifocal lens according to an embodiment of the present invention.

FIG. 5 is a graph showing changes of angles formed by normal lines of points along each vertical crossing curve being at respective distances from a principal meridional line of a progressive multifocal lens according to an embodiment of the present invention. The vertical axis indicates the angle θ (degree) formed by normal lines and the principal meridional plane. The horizontal axis shows coordinates in the vertical direction and its left end corresponds to the upper end of the farsight portion F while its right end corresponds to the lower end of the nearsight portion N. That is, the left side section of the graph corresponds to the farsight portion F, the right side section thereof corresponds to the nearsight portion N and the middle side section corresponds to the intermediate portion P.

In this embodiment, in the progressive multifocal lens designed symmetrically, the change of the angle θ formed by the principal meridional plane and normal lines of points along vertical crossing curves M1, M2, M3, M4, M5, M6 and M7 being away from the principal meridional curve in the horizontal direction respectively by 5 mm, 10 mm, 15 mm, 20 mm, 25 mm, 30 mm and 35 mm is plotted.

Thus, according to the progressive multifocal lens of this embodiment, the angle θ is gently and monotonously increased or decreased away from the principal meridional curve. As a result, the change of the horizontal prism is gentle and monotonous toward the peripheral region of the lens, so that distortion of an image is reduced, contributing to the improvement of the dynamic vision.

Figure 6:
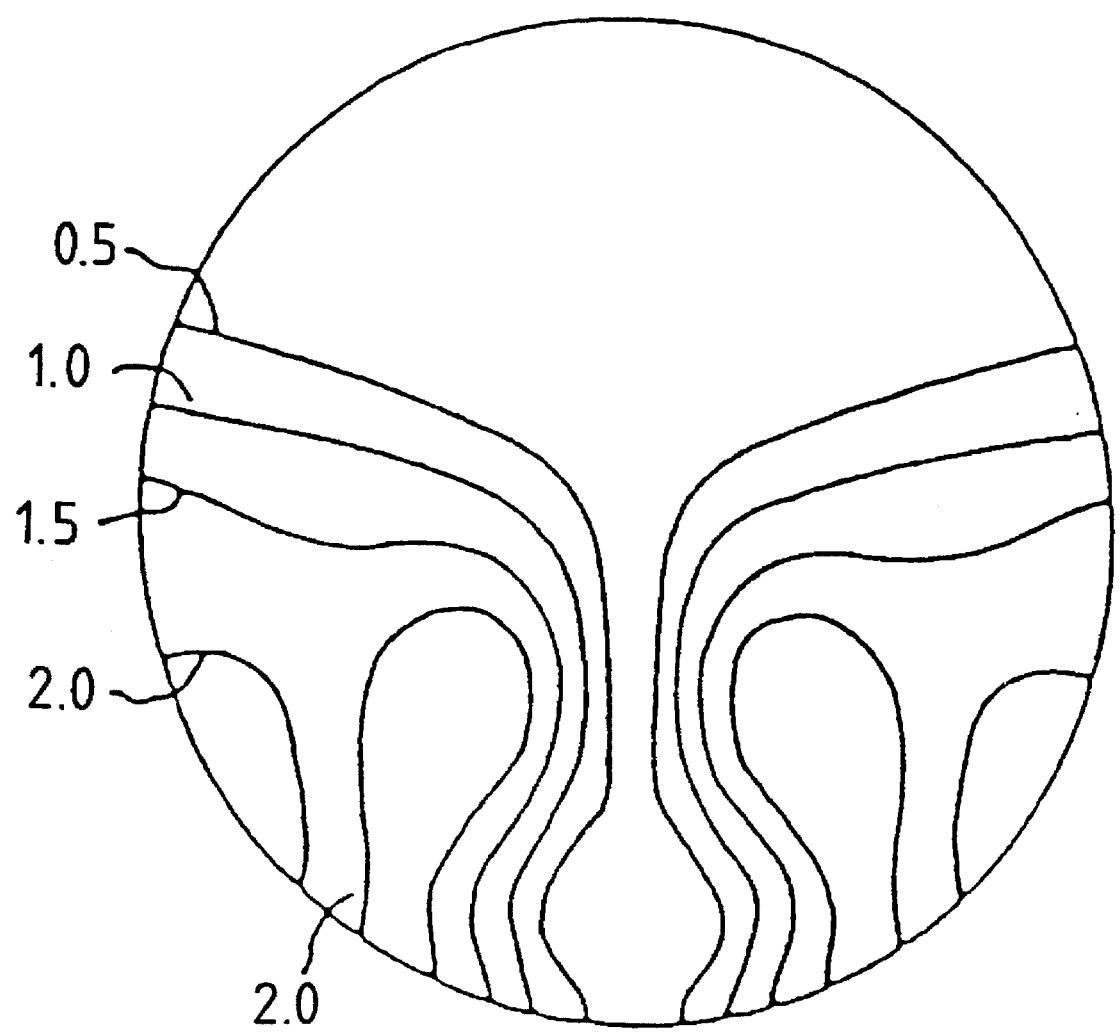
FIG. 6 is a graph showing astigmatic difference curves of the progressive multifocal lens having the lens surface shape shown in FIG. 5.

FIG. 6 is a graph showing astigmatic difference curves of the progressive multifocal lens of this embodiment. The astigmatic difference curves are plotted by 0.5 D.

As is apparent from FIG. 6, in the progressive multifocal lens of this embodiment, the distortion of an image is reduced to improve the dynamic vision and astigmatism is also reduced to improve the static vision.

As conventional progressive multifocal lenses, there are a type in which a lens surface is formed by microscopic spherical surfaces connected continuously along a principal meridional curve over its entire line, i.e., formed by a so-called umbilical point curve and a type in which a refracting surface is formed such that the curvature ρm along the principal meridional curve and the curvature ρs in the direction perpendicular to the principal meridional curve are substantially different on a portion of the principal meridional curve.

Namely, regarding the surface shape on the principal meridional curve, conventional progressive multifocal lenses can be classified roughly into a type in which the curvature ρm along the principal meridional curve and the curvature ρs in the direction perpendicular to the principal meridional curve are approximately equivalent over the entire principal meridional curve to be an umbilical-like and a type in which the curvature ρm along the principal meridional curve and the curvature ρs in the direction perpendicular to the principal meridional curve are substantially different in at least a portion on the principal meridional curve. The present invention is applicable to both types of progressive multifocal lenses.

Also, in an asymmetrical progressive multifocal lens in which a nearsight portion is asymmetrically arranged in consideration of the fact that the nearsight portion comes close to a nasal side, a center line consisting of a segment between the center of a farsight portion and a farsight eye point and a segment between the center of a nearsight portion and the farsight eye point can be handled as a reference line, i.e., a principal meridional curve, as mentioned above. Therefore, the present invention is also applicable to the progressive multifocal lens designed asymmetrically based on this principal meridional curve.

As described above, in the progressive multifocal lens of the present invention, not only the absolute value of the change amount of the horizontal prism is reduced but also the change of the horizontal prism along the respective vertical crossing curves is gentle and monotonous toward the peripheral region of the lens. As a result, astigmatism and distortion of an image can be minimized over the entire refracting surface to obtain optimum aberration valance. Then, the improvement of the static vision due to the reduction of the astigmatism as well as that of the dynamic vision due to the reduction of the distortion of the image are realized.

What is claimed is:

1. A progressive multifocal lens comprising, along a principal meridional curve, a farsight portion having a refracting power corresponding to a distant view, a nearsight portion having a refracting power corresponding to a near view, and an intermediate portion, located between said farsight and nearsight portions, for continuously connecting said refracting powers of the farsight and nearsight portions, and wherein a lens refracting surface has a shape such that the angle θ formed by normal lines of said refracting surface at respective points on each of vertical crossing curves of said lens refracting surface and a principal meridional curve is changed gently and monotonously away from said principal meridional curve along said vertical crossing curves.

2. A progressive multifocal lens according to claim 1, wherein the angle θ at any point over said entire lens refracting surface satisfies the following condition:

$$\tan^{-1}(H \cdot D_F/(n-1)) \leq |\theta|$$

$$\tan^{-1}(H \cdot (D_F+A)/(i\ n-1)) - |\theta|$$

wherein n: a refractive index of said lens

H (m): a distance of said any point from said principal meridional curve in the horizontal direction $D_F$ (diopter): the refracting power of said farsight portion A (diopter): an additional power.

* * * * *